(12) United States Patent
Adiga

(10) Patent No.: US 11,494,914 B2
(45) Date of Patent: *Nov. 8, 2022

(54) SMART METROLOGY ON MICROSCOPE IMAGES

(71) Applicant: FEI Company, Hillsboro, OR (US)

(72) Inventor: Umesh Adiga, Portland, OR (US)

(73) Assignee: FEI Company, Hillsboro, OR (US)

( * ) Notice: Subject to any disclaimer, the term of this patent is extended or adjusted under 35 U.S.C. 154(b) by 6 days.

This patent is subject to a terminal disclaimer.

(21) Appl. No.: 16/929,709

(22) Filed: Jul. 15, 2020

(65) Prior Publication Data

US 2020/0349713 A1 Nov. 5, 2020

Related U.S. Application Data

(63) Continuation of application No. 16/177,034, filed on Oct. 31, 2018, now Pat. No. 10,748,290.

(51) Int. Cl.
*G06T 7/11* (2017.01)
*G06T 3/40* (2006.01)
*G06T 5/00* (2006.01)
*G06T 7/60* (2017.01)

(52) U.S. Cl.
CPC .............. *G06T 7/11* (2017.01); *G06T 3/40* (2013.01); *G06T 5/002* (2013.01); *G06T 5/003* (2013.01); *G06T 7/60* (2013.01); *G06T 2207/10056* (2013.01)

(58) Field of Classification Search
CPC .. G06T 5/50; G06T 7/001; G06T 7/11; G06V 10/60; G06V 10/758
See application file for complete search history.

(56) References Cited

U.S. PATENT DOCUMENTS

| | | | | | |
|---|---|---|---|---|---|
| 5,960,121 | A | * | 9/1999 | Takahashi | H04N 1/4092 358/448 |
| 6,370,279 | B1 | * | 4/2002 | Paik | G06T 5/20 382/268 |
| 7,466,872 | B2 | * | 12/2008 | Oh | G06T 7/12 382/256 |
| 7,525,593 | B2 | * | 4/2009 | Ichikawa | H04N 5/217 348/370 |
| 7,547,602 | B2 | * | 6/2009 | Shukuri | H01L 29/792 438/258 |
| 7,567,724 | B2 | * | 7/2009 | Gomi | G06T 3/403 348/613 |

(Continued)

*Primary Examiner* — Yosef Kassa

(57) ABSTRACT

Smart metrology methods and apparatuses disclosed herein process images for automatic metrology of desired features. An example method at least includes extracting a region of interest from an image, the region including one or more boundaries between different sections, enhancing at least the extracted region of interest based on one or more filters, generating a multi-scale data set of the region of interest based on the enhanced region of interest, initializing a model of the region of interest; optimizing a plurality of active contours within the enhanced region of interest based on the model of the region of interest and further based on the multi-scale data set, the optimized plurality of active contours identifying the one or more boundaries within the region of interest, and performing metrology on the region of interest based on the identified boundaries.

18 Claims, 7 Drawing Sheets

(56) References Cited

U.S. PATENT DOCUMENTS

| | | | | |
|---|---|---|---|---|
| 8,358,877 B2* | 1/2013 | Noguchi | ............... | H04N 19/137 |
| | | | | 382/243 |
| 8,502,875 B2* | 8/2013 | Matsuda | ............ | H04N 1/00204 |
| | | | | 348/352 |
| 8,587,818 B2* | 11/2013 | Imaizumi | ............... | H04N 1/387 |
| | | | | 348/222.1 |
| 8,699,813 B2* | 4/2014 | Singh | ..................... | H04N 5/213 |
| | | | | 382/256 |
| 9,095,269 B2* | 8/2015 | Morita | ............... | A61B 1/00009 |

* cited by examiner

SMART METROLOGY ON MICROSCOPE IMAGES

This Application is a continuation of U.S. patent application Ser. No. 16/177,034, filed Oct. 31, 2018.

FIELD OF THE INVENTION

The techniques disclosed herein are generally related to implementing smart metrology using images, and more specifically related to performing smart metrology on images obtained with a charged particle microscope.

BACKGROUND OF THE INVENTION

Metrology of features in images can be a difficult and lengthy process, especially on images obtained by a charged particle microscope. The difficulty and lengthy process may be due in part to noisy images that automatic imaging processing algorithms have difficulty processing, which leads to user manipulation and multiple steps. This may not be an issue when there are only a few images to analyze. However, in a manufacturing environment, such as the semiconductor industry, where large numbers of samples are imaged and require analysis, this process truly slows down needed analysis.

While some improvements to image processing have occurred over the years leading to improved metrology accuracy and efficiency, these improvements are not enough in today's semiconductor manufacturing climate, e.g., node size and throughput. As such, improvements to image process and metrology automation are desired across an industry.

SUMMARY

Smart metrology methods and apparatuses disclosed herein process images for automatic metrology of desired features. An example method at least includes extracting a region of interest from an image, the region including one or more boundaries between different sections, enhancing at least the extracted region of interest based on one or more filters, generating a multi-scale data set of the region of interest based on the enhanced region of interest, initializing a model of the region of interest; optimizing a plurality of active contours within the enhanced region of interest based on the model of the region of interest and further based on the multi-scale data set, the optimized plurality of active contours identifying the one or more boundaries within the region of interest, and performing metrology on the region of interest based on the identified boundaries.

Another embodiment includes non-transitory computer readable medium including code that, when executed by one or more processors, causes the one or more processors to extract a region of interest from an image, the region including one or more boundaries between different sections of the region of interest; enhance at least the extracted region of interest based on one or more filters; generate a multi-scale data set of the region of interest based on the enhanced region of interest; initialize a model of the region of interest, the initialized model determining at least first and second bounds of the region of interest; optimize a plurality of active contours within the enhanced region of interest based on the model of the region of interest and further based on the multi-scale data set, the optimized plurality of active contours identifying the one or more boundaries within the region of interest; and perform metrology on the region of interest based on the identified boundaries.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Like reference numerals refer to corresponding parts throughout the several views of the drawings.

DETAILED DESCRIPTION OF EMBODIMENTS

Figure 1:
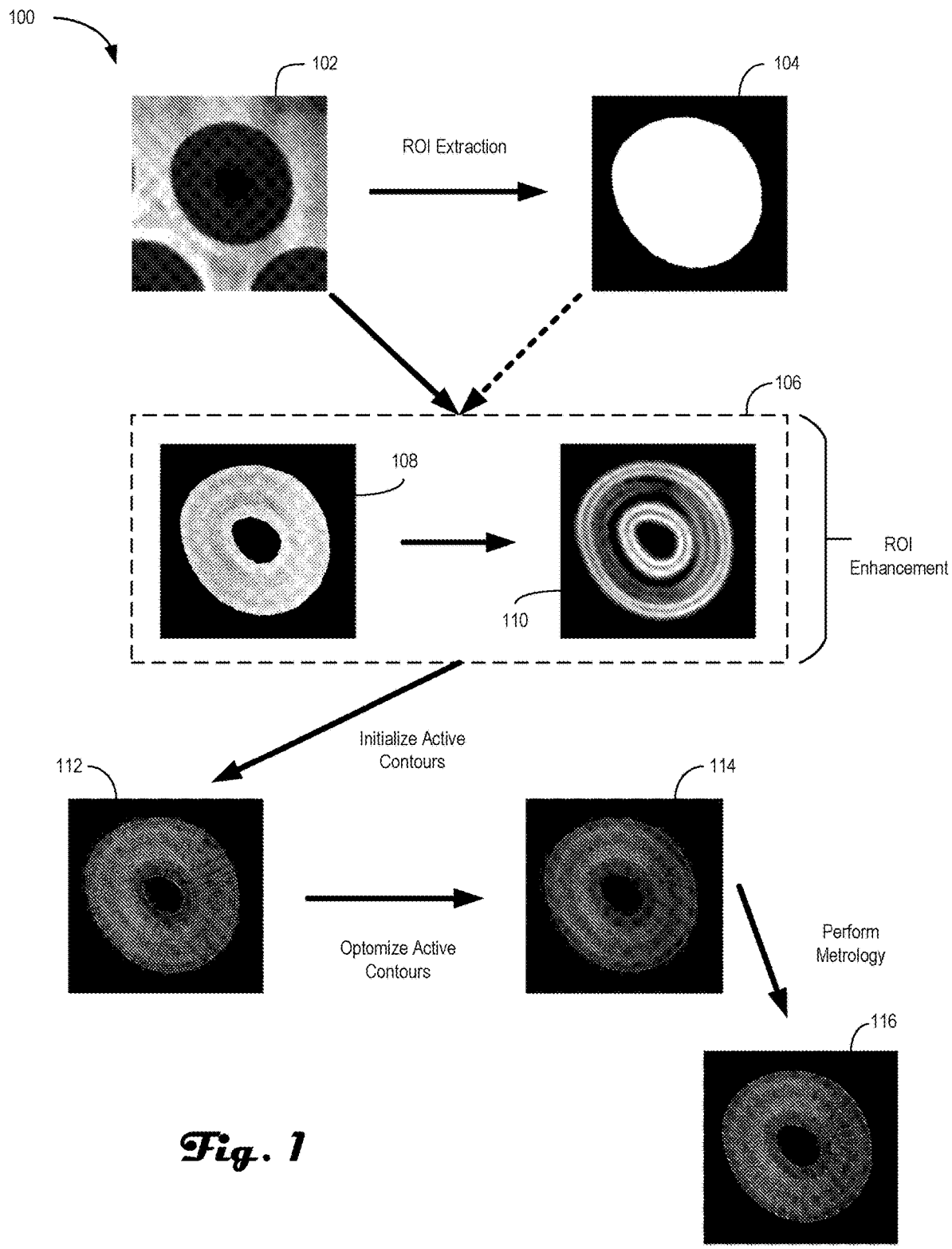
FIG. 1 is an example image sequence showing image processing and resulting metrology in accordance with an embodiment of the present disclosure.

Embodiments of the present invention relate to smart metrology on microscope images. In some examples, the images are processed to enhance desired features then active contours are optimized to locate boundaries formed at feature interfaces. The active contours then become anchors for performing accurate metrology on the features. However, it should be understood that the methods described herein are generally applicable to a wide range of different AI enhanced metrology, and should not be considered limiting.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items. Additionally, in the following discussion and in the claims, the terms "including" and "comprising" are used in an open-ended fashion, and thus should be interpreted to mean "including, but not limited to . . . " The term "integrated circuit" refers to a set of electronic components and their interconnections (internal electrical circuit elements, collectively) that are patterned on the surface of a microchip. The term "semiconductor device" refers generically to an integrated circuit (IC), which may be integral to a semiconductor wafer, separated from a wafer, or packaged for use on a circuit board. The term "FIB" or "focused ion beam" is used herein to refer to any collimated ion beam, including a beam focused by ion optics and shaped ion beams.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

The smart metrology techniques disclosed herein enable automatic metrology of features in images. The images may be obtained with charged particle microscopes (SEM, TEM, STEM, FIB, etc.) or optical microscopes, to provide a couple of examples. The images may typically include one or more features, e.g., regions of interest, and it is desired to determine sizes of at least the one or more features. The smart metrology may perform measurements based on a plurality of image processing algorithms in conjunction with active contours, for example. The active contours may be initialized based on the image processed images and iteratively optimized using one or more scale spaces. For example, an image may be initially processed to locate and isolate one or more regions of interest (ROIs). One or more of these ROIs may then be subject to data properties standardization filtering to increase signal-to-noise ratio (SNR) and/or to improve contrast between portions of the feature in the image. After improving SNR and/or contrast in the image, the image is subject to one or more image processing algorithms to enhance sharpness and/or differentiation and detection of boundaries between portions of the feature. The differentiation and detection of the boundaries may be performed with or without transforming the data into different representation space, such as Cartesian space or Polar space as may be required by the specific image processing algorithms implemented. The data resulting from the previous processes is then processed to generate a multi-scale data set in Gaussian, geometric, non-linear and/or adaptive shape scale spaces. The multi-scale data set is then used for initializing a plurality of active contours in the image. The active contours are then iteratively initialized and optimized in each resolution level of the one or more space scales allowing for step-wise optimization of the active contours. Once optimized, the active contours identify and locate all boundaries within the ROI.

The optimized active contours may then form the basis for performing metrology on desired portions or aspects of the feature in the original image or an enhanced image. The metrology may include geometric analysis of segmented regions of the feature based on the contours therein. Further, the metrology may inform other analytical aspects of feature analysis along with statistical analysis, etc.

Additionally or alternatively, the active contours may be initiated based on a separate imaging mode, e.g., multi-modal analysis. For example, the sample containing the feature may be analyzed using energy dispersive x-ray spectroscopy (EDX) to first determine an initial boundary between portions of the feature, which may then be used as locations for initializing a respective active contour. The EDX may be a single line scan across the sample, which will provide at least one point on the feature of where the boundary may be. Some samples may include round ROIs, which would then provide two points for each boundary from the EDX line scan. Of course, a full 2-D EDX scan may also be performed, but the time involved may not be desirable.

FIG. 1 is an example image sequence 100 showing image processing and resulting metrology in accordance with an embodiment of the present disclosure. The image sequence 100 may be performed on any image types, but will be discussed in the context of images obtained by charged particle microscopy. More specifically, but not limiting, the images used for illustrating the disclosed techniques are of semiconductor structures. The image processing and metrology may be performed on any desired image content and the oval-shaped features of the images in FIG. 1 are only for example and are non-limiting to the techniques disclosed herein. For the image sequence 100, the oval-shaped area is a vertical memory device, sometimes referred to as VNAND. These devices include various layers formed in tall vias (e.g., holes formed in the material that extend through one or more epi-layers), where each one of the various material layers are formed from different materials so that a working circuit device is formed. For process control and defect detection, manufacturers of VNAND devices desire measurements of the thickness of the material layers that form the operational device, which requires high resolution microscopy, such as SEMs and/or TEMs, to identify the material layers and their interfaces, e.g., boundaries therebetween.

Image sequence 100 begins with original image 102. While image 102 appears to be a dark oval shape surrounded by a lighter colored area, there are actually a number of rings, e.g., material layers, within the dark oval shape, as can be seen in images 108 and 110 for example. The image 100 may be a dark field (DF) image or a HAADF image (high angle annular dark field), which conventionally result in the background being lighter than the regions of interest (ROI). For the image processing sequence, the goal is to determine the location and/or the boundaries of each ring within the ROI, and measure the width of one or more of the rings, e.g., perform metrology on the VNAND device. To perform the desired metrology, at least the boundaries between them are to be identified so that more precise measurements can be taken. To perform such measurements, however, the image may need to be enhanced and the location of the boundaries may need to be more accurately identified.

In general, the sequence may include a pre-processing segment that enhances the image in terms of signal-to-noise ratio, contrast, region sharpness, etc., and that also includes extraction/identification of one or more ROIs. After pre-processing, or image enhancement in general, a multi-scale data set is generated so that active contours can be initialized and optimized. The optimized active contours will locate the boundaries between the various materials within the image. Based on identification of the boundaries, metrology of the desired layers or areas in the image may then be performed, which may be performed automatically.

To begin the image processing, the original image 102 may be analyzed to extract one or more ROIs. The extraction of the ROIs may provide a rough outside boundary to each of the ROIs and designate an area where the image processing may be concentrated, e.g., within the rough outside boundaries. There are many techniques to employ for ROI extraction, such as binarizing the image to define the outer bounds for one example. Additional techniques will be discussed below. In some embodiments, the meta-information of the original image may also be taken into account in the image processing. The meta-information including such information as data type (e.g., imaging mode), resolution, pixel-size, and etc.

After extracting the ROIs, at least that portion of the image is subject to further processing to enhance the image of the ROI as indicated in dashed box 106. In general, the enhancement of the ROI includes reducing the signal-to-noise ratio, enhancing contrast and image sharpness so that the boundaries between the different sections/materials are roughly identified. For example, image 108 shows the ROI from the original image (with the background removed) with improved contrast. The improved contrast image 108 may then be subject to further processing to increase sharpness, as shown by image 110. The image 110 shows the ROI after various filtering operations have been performed, such as reaction-diffusion filtering for example.

Additionally, the image 110 may be used to generate a multi-scale data set, where different scales at least include Gaussian scale space, geometric scale space, non-linear scale space, and adaptive shape scale space. The image in each scale space is then subject to a series of blurring and subsampling to smooth out the image. Such processing is performed to build potential surfaces for smooth deformation of active contours.

Further, a model of the ROI is formed to provide bounds of the ROI for further processing. For example, various maps of the ROI may be generated to determine an inner bound and an outer bound used to establish the area where further image processing is to occur. An example map is a distance map of the ROI that determines a center and an outside edge of the ROI.

After the one or more ROIs of the original image have been enhanced at least for sharpness and contrast, a large number of active contours may be initiated within the enhanced ROI and placed in response to the generated model of the ROI, where a large number includes tens to hundreds of active contours. A large number of active contours are used because the number of boundaries, e.g., material layers, and their locations may not be known a priori. In general, the number of initialized active contours will be greater than the number of boundaries. Image 112 shows the initialization of a plurality of active contours within the ROI, which may be placed on the original image or the enhanced version of the original image. The active contours will be allowed to optimize to locate the boundaries, which will coincide with minimum energy locations of the image. Image 114 shows the optimized active contours, e.g., snakes. Some of the plurality of active contours will incorrectly optimize, and will be removed as a result. For example, an incorrectly optimized active contour may relax to different boundaries within an ROI.

The optimized active contours may then be used as references for measuring the thickness of different material layers within the ROI, as shown in image 116.

Figure 2:
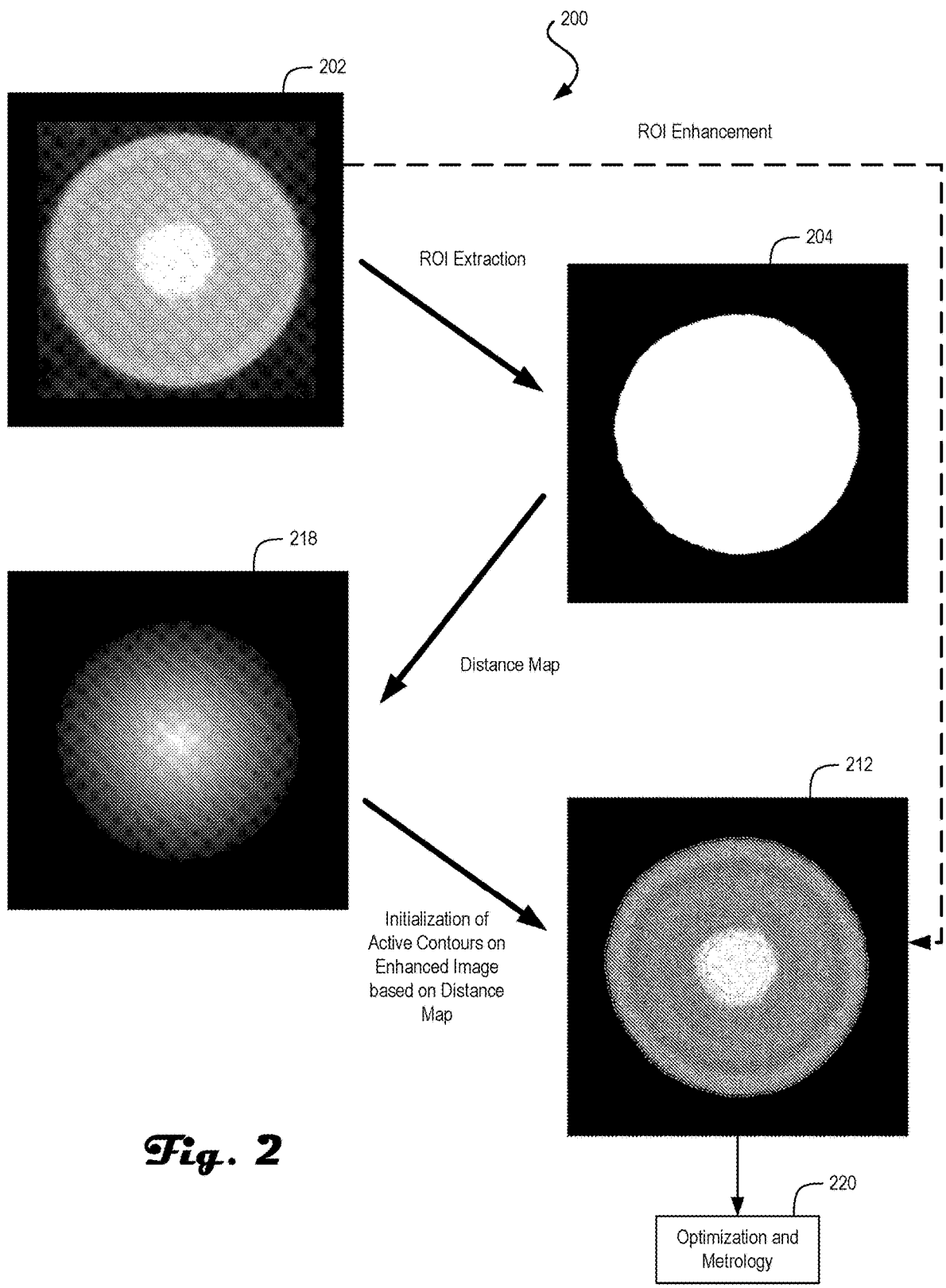
FIG. 2 is an example image sequence showing image processing in accordance with an embodiment of the present disclosure.

FIG. 2 is an example image sequence 200 showing image processing in accordance with an embodiment of the present disclosure. The sequence 200 is an example image processing sequence that illustrates a different part of the overall sequence than that shown in image sequence 100. In general, each step of the process discussed herein may be performed using any one or more of image processing algorithms, and the selection of the algorithms implemented may at least be based on the meta-information of the original image and automatically selected. The image sequence 200 begins with original image 202, which, as can be seen, is of different initial quality than image 102. Additionally, the image 202 may have been obtained using a bright field (BF) image or a TEM imaging mode that produces an image with the background darker than the ROI. The VNAND structure of image 202 may be processed to extract the ROI, the result shown in image 204. As noted above, the extraction of the ROI may generally establish an outer boundary of the ROI.

The extracted ROI of image 204 may then be used as a template for forming a distance map on image 202, e.g., initialize a model of the ROI. The distance map is centered on the ROI and can be used to bound the initial placement of active contours, as shown in image 212. Additionally, the model of the ROI shown in image 218 is used to establish inner and outer bounds, which are indicated by the inner most and outer most dashed lines in image 212. The active contours of image 212 may be placed on an image that has gone through processing for ROI enhancement, such as shown in box 106 of sequence 100, along with the generation of a multi-scale data set that provides energy values to areas within the ROI. The active contours can be placed at increasing distances from the background, e.g., the area outside of the extracted ROI, but within the ROI. Additionally, the model of the ROI shown in image 218 is used to establish inner and outer bounds, which are indicated by the inner most and outer most dashed lines in image 212.

After the active contours are placed, they are allowed to optimize based on the multi-scale data set. After optimization of the active contours, metrology may be performed on the layers of the VNAND shown in image 202, as shown in box 220.

Figure 3:
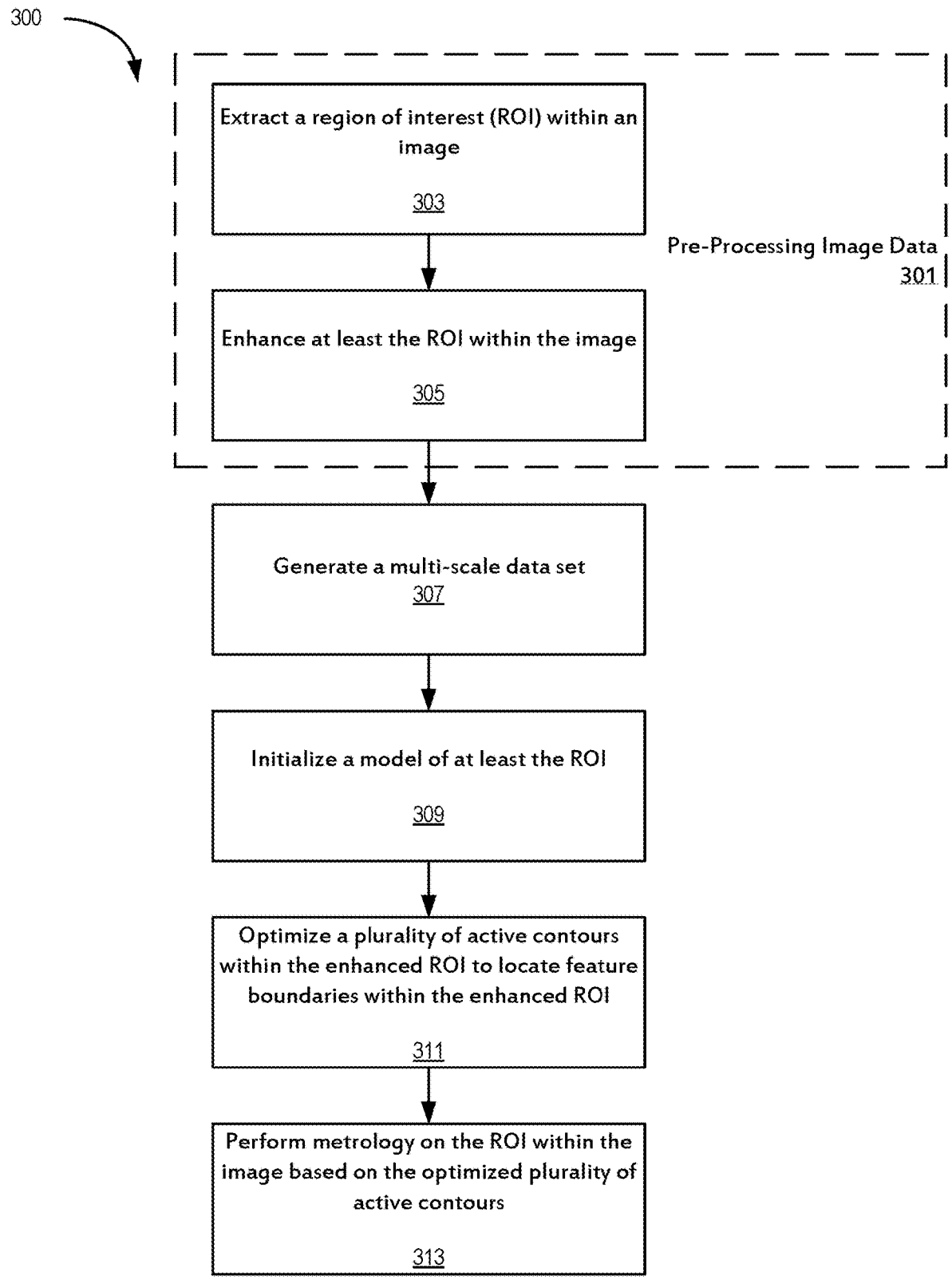
FIG. 3 is an example method for processing an image and performing metrology on one or more features within the image in accordance with an embodiment of the present disclosure.

FIG. 3 is an example method 300 for processing an image and performing metrology on one or more features within the image in accordance with an embodiment of the present disclosure. The method 300, which is at least partially illustrated in FIGS. 1 and 2, may be performed on images obtained with a charged particle microscope, such as an SEM, TEM, STEM, to name a few. However, the use of charged particle images is not limiting on the techniques disclosed herein. Additionally, the method 300 may be performed by the imaging tool hardware, one or more servers coupled to the imaging tool via a network, a user's desktop workstation, or combinations thereof. In general, the method 300 implements one or more image processing techniques automatically selected from a library of techniques to arrive at an image that can be accurately and autonomously measured, e.g., have metrology performed on the one or more features of the image.

The method 300 may begin at process block 301, which includes pre-processing the image. In general, the image may experience some processing to enhance contrast and sharpness before active contours are used to identify boundaries within an ROI leading to metrology of layers forming those boundaries. The pre-processing may include multiple processes to extract the ROI, enhance contrast/region sharpness, improve SNR, and differentiate and detect region boundaries. The image enhancement can be performed only in the ROI or over the entire image, and is a non-limiting aspect of the present disclosure. Of course, confining the enhancement to within the ROI may improve process time and efficiency of the overall method 300.

Process block 303, an optional sub-step of process block 301, includes extracting a region of interest from an image. The image may be an originally obtained image, such as images 102, 202, or may be a cropped portion of an original image. Along with the image data of the input image, the process 300 also receives meta-information about the input image, where the meta-information includes the data type (e.g., imaging mode), pixel-size, and other data regarding the image. The meta-information may be used to help automatically determine what image processing techniques to implement in the image processing steps of method 300, e.g., at least steps 301 and 303. The meta information attached to the image makes the pre-processing filters implemented in process block 301 to auto-tune their parameters to the imaging mode of the image. Resolution assists in deciding which material layer is accurately segmented. For example, if the image is of lower resolution, some material layers that are only one or two nanometers thick may not have enough pixels in them to be resolved accurately. Pixel size, also related to the resolution, may be necessary to automate the process by normalizing the data to standard pixel size as well as to produce measurements in standard MKI units rather than pixel units.

There are many image processing techniques that can be used for extracting the ROI. The following includes a non-exclusive list of techniques that can be implemented, but the technique used is a non-limiting aspect of the present disclosure: linear isotropic diffusion, histogram manipulation for contrast enhancement, automated thresholding, component labeling, problem specific size and shape criteria, partial representation detection and elimination, etc., which are selected and applied automatically. The extraction of the ROI may provide a rough boundary within which the additional image processing and metrology will be performed.

The process block 303 may be followed by process block 305, which includes enhancing at least the ROI within the image. The enhancement, in general, is performed to obtain data property standardization and to improve detection of region boundaries within the ROI. Additionally, the enhancement may improve image contrast, signal-to-noise ratio (SNR), region sharpness, differentiation and detection of region boundaries. The differentiation and detection of region boundaries may be performed with or without transforming data into different representation space such as Cartesian space or Polar space as may be required by an implemented image filtering technique.

In some embodiments, process block 305 may be split into two process steps, where contrast and SNR are improved in one step (Step A) and enhancing region sharpness and differentiation and detection of region boundaries are performed in another step (Step B). Many image manipulation algorithms may be selected to implement Step A, such as histogram manipulation, linear and non-linear contrast enhancement, data normalization based on local, low-frequency data distribution, gamma correction, log-correction, brightness correction, etc., where a selected algorithm is applied automatically to at least the ROI of the image, and selected based on at least the meta information.

It should be noted that Step A also performs the data property standardization step.

Likewise, Step B includes selection of one or more algorithms from a group of similar algorithms that is automatically implemented, based again at least on the meta information. The implemented algorithm may be selected from reaction-diffusion filtering, adoptive isotropic and anisotropic diffusion, median filtering, Mumford-Shah model based non-linear diffusion, background suppression and edge/boundary extraction, coherence enhancement filtering on the object boundaries, and application of amplitude features, texture (Gabor, Haralick, Laws, LCP, LBP, etc.) techniques. In some embodiments, application of another imaging modality, such as energy dispersive x-ray spectroscopy (EDX), electron energy loss spectroscopy (EELS), etc., if available, may be used to differentiate the region boundaries. A more detailed discussion of the use of other imaging modalities is included below.

Process block 301 may be followed by process block 307, which includes generating a multi-scale data set of at least the ROI. The multi-scale data set may be generated in one or more of a number of scale spaces, such as Gaussian scale space, geometric scale space, non-linear scale space, and adaptive shape scale space. The one or more scale spaces used to generate the multi-scale data set will be used for optimizing a plurality of active contours. The active contours may be initialized and optimized on each scale level to determine the boundaries within the ROI on the original scale level. As such, the multi-scale data set will be a basis of optimizing active contours to identify the boundaries between the sections of the ROI.

The process block 307 may be followed by process block 309, which includes initializing a model of at least the ROI. Process block 309 initializes a general model of the ROI to form first and second bounds of the ROI. The additional processing will mainly be performed within the bounds set by the model. The model may be formed based on one or more techniques chosen from: Binary labelled maps, interactive maps, distance maps, CAD maps, statistical models from the data, Dye cast, random distribution of geometric shapes, geometric models, etc. The distance map shown in image 218 provides an example of an initial model. It should be noted that process block 309 can be performed in parallel with process blocks 305 and 307, and does not need to follow process block 307. Additionally, the model initialized in process block 307 may be based on either the original image or the enhanced image.

The process block 309 may be followed by process block 311, which includes optimizing a plurality of active contours within the enhanced ROI to locate feature boundaries within the enhanced ROI. The process of optimizing the active contours, or allowing the active contours to optimize, may begin with initializing a first plurality of active contours, where the first plurality is a greater number than the number remaining after optimization and is also a greater number than boundaries within the ROI. Initializing more active contours than there are boundaries may be performed due to the lack of a priori knowledge of the number of boundaries within the ROI and/or their location within the ROI. While all of the initialized active contours will optimize, some will likely combine due to optimizing to the same boundary while others may be removed due to incorrectly optimizing, e.g., optimizing to different boundaries within the ROI. As such, the optimized active contours will identify and locate the boundaries separating the different sections/materials within the ROI.

The process of initializing and optimizing the active contours may be an iterative process performed at and based on each scale level of the multi-scale data set generated in process block 307. For example, a first initialization and optimization of active contours may be performed at a fourth level of scale of the enhanced ROI image, where the fourth level of scale has a $\frac{1}{16}^{th}$ resolution of the original enhanced ROI image. The active contours that optimize on the fourth level of scale image then become the initial active contours on the third level of scale image, e.g., a $\frac{1}{8}^{th}$ resolution image, which are then allowed to optimize. This process is iterated until the original scale image has had active contours initialized and optimized, thus identifying and locating the desired boundaries within the ROI.

The process block 311 may be followed by process block 313, which includes performing metrology on the ROI within the original image based on the optimized plurality of active contours. The metrology may provide measurements of the width of the different sections based on the distance between different boundaries, and further provide information on the overall shape of the boundaries. In some embodiments, the metrology may use geometric analysis of the segmented, e.g., identified sections, and the contours. Post metrology, the obtained data may be used for statistical inference, hypothesis generation, defect detection, process control, temporal analytics, prediction and other applications.

Figure 4:
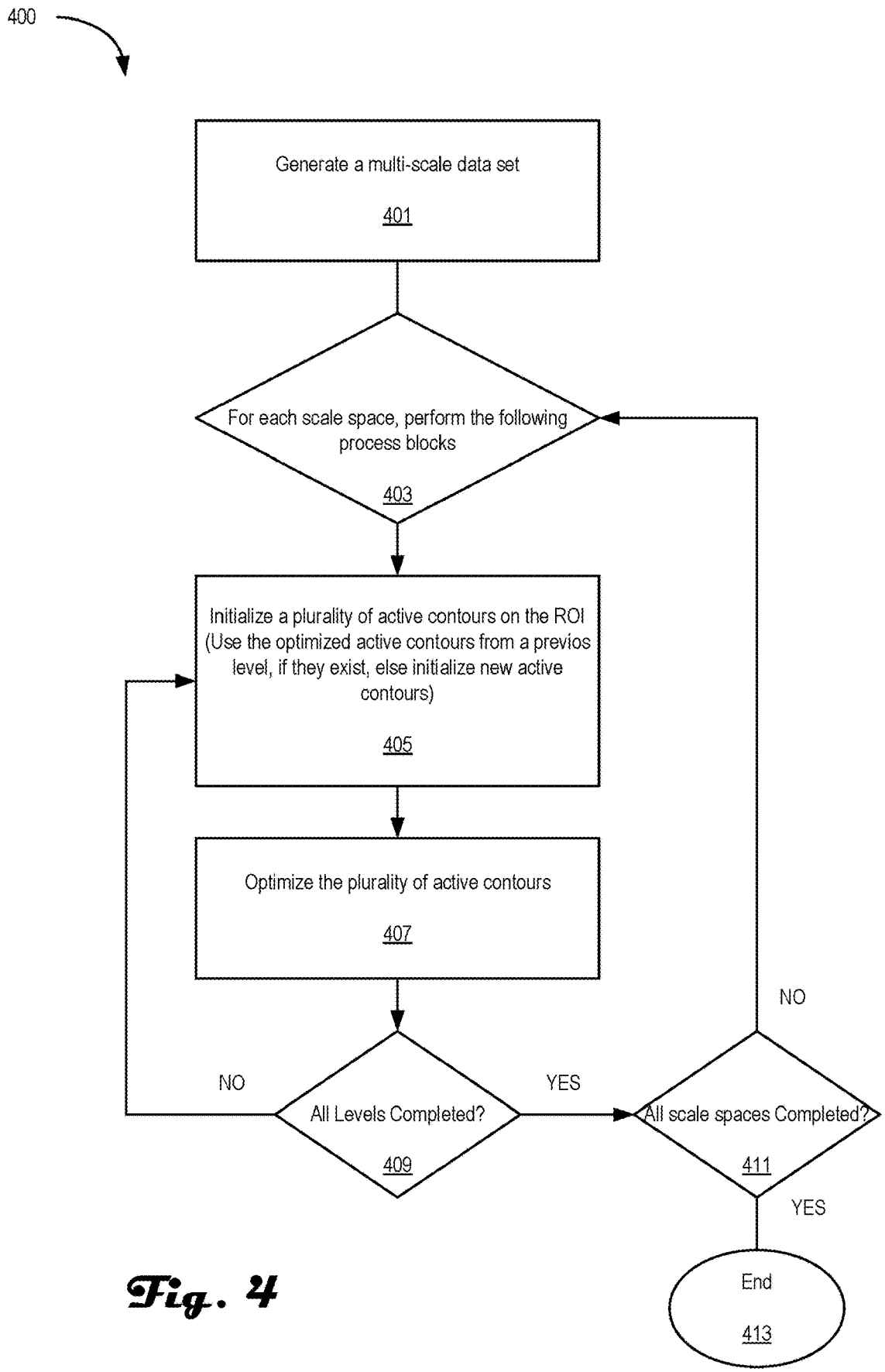
FIG. 4 is a method for optimizing a plurality of active contours within an ROI in accordance with an embodiment of the present disclosure.

FIG. 4 is a method 400 for optimizing a plurality of active contours within an ROI in accordance with an embodiment of the present disclosure. The method 400 can be implemented in conjunction with method 300, such as step 311, and may provide one example of the implementation of step 311. The method 400 may begin at process block 401, which includes generating a multi-scale data set of an image. The multi-scale data set will include data sets at multiple resolution levels and for each of a plurality of scale spaces, such as Gaussian, geometric, non-linear and adaptive shape scale spaces, to name a few. Of course, other scale spaces may also be implemented. The multi-space data set is generated from an enhanced image, such as that produced by process block 301 of method 300. Using the enhanced image provides better defined boundaries, which are highlighted and smoothed out in the multi-scale data set. Process block 401 may be followed by process block 403, which directs the remainder of method 400 to be completed for each scale space.

For each scale space, the process blocks 405 and 407 may be performed for each resolution level. And once all resolution levels of a scale space are performed, the optimized active contours may be used as the initial active contours for a subsequent scale space. Of course, that is not limiting and each scale space may begin with a new set of active contours.

The process block 403 may be followed by process block 405, which includes initializing a plurality of active contours on the ROI. If this is the initial performance of process block 403 for a scale space, then the plurality of active contours will be initialized on a lowest resolution level data. The lowest resolution level may be dependent on the initial quality of the image but can be $\frac{1}{16}^{th}$ resolution, or less. The lowest level used, however, is a non-limiting aspect of the present disclosure. If this is not the lowest level resolution image, then the initialized active contours will be the optimized active contours from a lower resolution level image, e.g., a previous iterations of process blocks 405 and 407.

The image of the ROI at the different resolution images in each of the scale spaces may be characterized as having been blurred an amount based on the level of resolution, where the lower the resolution the more blurring that occurs. The blurring of the boundaries of the enhanced image provides a larger energy band for the active contours to optimize in response to. It should also be noted that the higher level data set has less blur, which results in a more narrow energy band for optimization. As such, by successively using active contours optimized at lower resolutions, the active contours are optimized to the full resolution in a step-wise manner.

The process block 405 may be followed by process block 407, which includes optimizing the plurality of active contours. The optimization of the active contours allows the active contours to move/settle in the middle of the smoothed out boundaries that each resolution level provides. As the process blocks 405 and 407 are iteratively performed, the active contours are optimized in a step-like function and they eventually optimize to the boundaries in the original resolution image thus identifying and locating the one or more boundaries in the image.

Process block 407 is followed by process block 409, which determines if all resolution levels of a scale space are complete. If no, then process block 405 and 407 are repeated for the next resolution level image. If so, then, method 400 proceeds to process block 411, which determines if all scale spaces have been completed. If not, then the process returns to process block 403, else it ends at process block 413. The completion of method 400 locates and identifies all boundaries within the ROI of the enhanced image, which may then be overlaid or associated with areas/boundaries in the original image.

Figure 5:
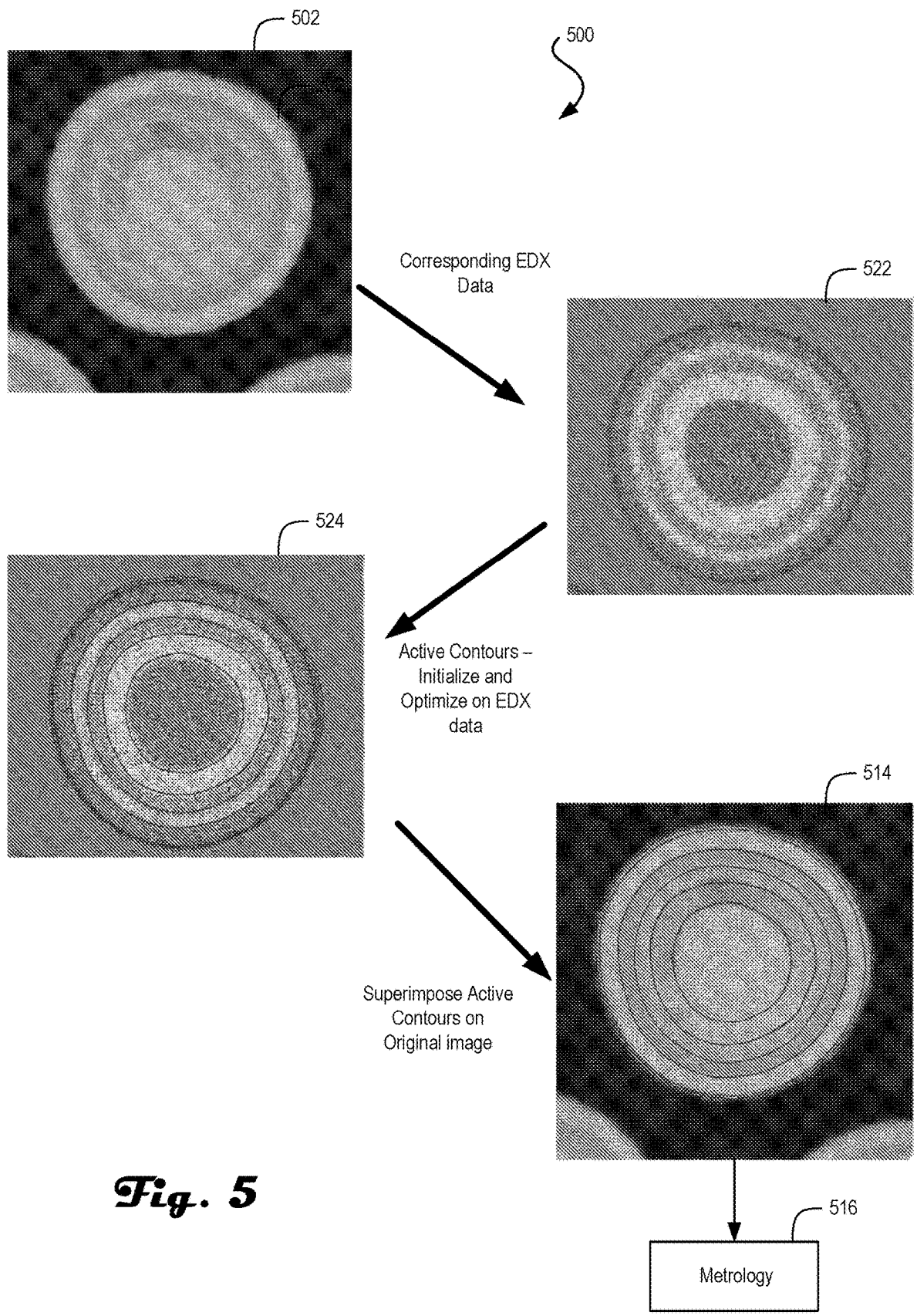
FIG. 5 is an example image sequence in accordance with an embodiment of the present disclosure.

FIG. 5 is an example image sequence 500 in accordance with an embodiment of the present disclosure. The image sequence 500 illustrates another process that can be used to initiate and optimize active contours for anchoring metrology. Image 502 includes an original image of a VNAND along with parts of two other VNANDs. Image 522 shows EDX data on the same VNAND as shown in image 502. As can be seen image 522, the EDX data, which provide chemical analysis, shows the changes between the materials forming the different rings of the VNAND. This chemical information may be used to determine a number of boundaries within the VNAND and a rough location of each of those boundaries.

In some embodiments, the EDX data may be provided by a large area scan as shown in image 522. However, such a large area scan may be replaced by a simple EDX line scan, which is quicker and more efficient. The EDX line scan may be performed across the VNAND, or any imaged structure, to identify the boundaries of each ring across the diameter of the structure.

The EDX data of image 522 may then be used to initialize a respective number of active contours at indicated boundaries and place them on the image 522 according to the location of the boundaries. Once the active contours are placed, they are allowed to optimize. The optimization of the active contours should more accurately identify the location of the boundaries. In some embodiments, the boundaries identified by the EDX data will be used to place a respective number of active contours for optimization. For example, if the EDX data show seven boundaries, then seven active contours will be initialized, with each active contour initialized at the location of one identified boundary. In other embodiments, enhanced image data will be used to generate a multi-scale data set, which then becomes the basis for the initialization and optimization of the active contours. In such embodiments, however, the number and location of the initialized active contours will be based on the boundaries identified by the EDX data.

As seen in image 514, the optimized active contours may be overlaid on the original image 502 or on an enhanced version of image 502 to provide a basis for performing metrology, as indicated in block 516.

Figure 6:
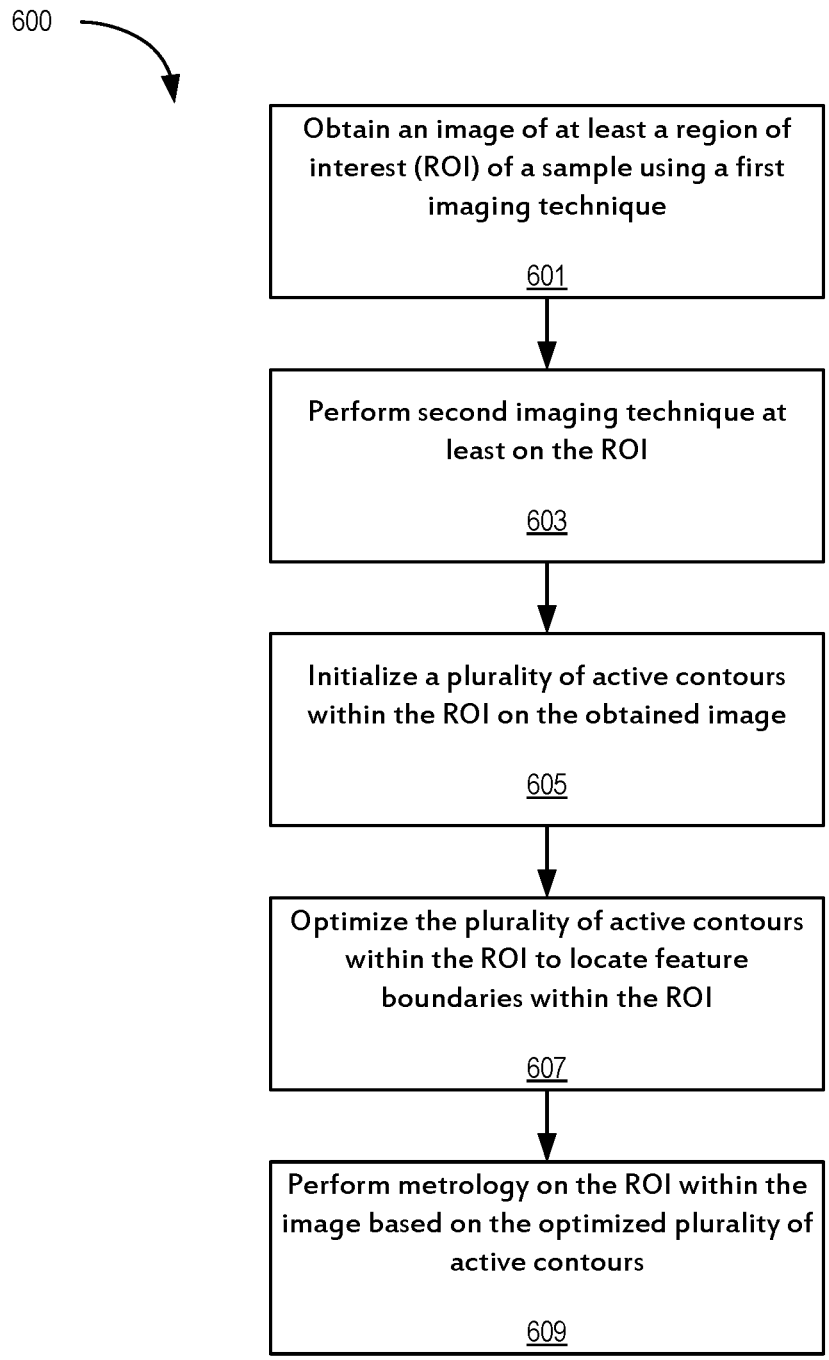
FIG. 6 is an example method in accordance with an embodiment of the present disclosure.

FIG. 6 is an example method 600 in accordance with an embodiment of the present disclosure. The method 600 is at least partially illustrated by the image sequence 500 and includes a different imaging modality than what was used to form an image to assist in determining section boundaries and anchoring metrology. While the disclosure uses EDX as the different modality, other modalities may also be used, such as EELS for example. The method 600 may begin at process block 601, which includes obtaining an image of at least an ROI of a sample. The image may be obtained using an SEM, TEM, STEM, or other imaging technique, which may be referred to as a first imaging technique. For charged particle microscopes, the image may be a gray-scale image based on electrons passing through the sample (e.g., TEM or STEM), secondary electrons (e.g., SEM), and/or backscattered electrons (e.g., SEM). Of course, the image may be obtained from a light-based microscope as well.

Process block 601 may be followed by process block 603, which includes performing a second imaging technique on at least the ROI. The second imaging technique can be any imaging/analytic modality different than the first imaging technique. In some embodiments, it may be desirable that the second imaging technique is a chemical analysis tool, such as EDX. Using EDX as an example second imaging technique, the EDX data will chemically show changes in material. These changes in material providing an approximation of boundaries within the ROI. Using EDX as the second imaging technique may be performed as either a two-dimensional area scan over all of the ROI, or as a line scan across the ROI.

Process block 603 may be followed by process block 605, which includes initializing a plurality of active contours within the ROI of the obtained image, the obtained image being obtained using the first imaging technique. In some embodiments, the obtained image is the originally obtained image that has not received any additional image processing. In other embodiments, however, the plurality of active contours may be initialized on an enhanced image that has been processed to improve contrast, SNR, sharpness, etc. along with undergoing imaging using the second imaging technique so that the boundaries are more defined. In yet another embodiment, the plurality of active contours may be iteratively and recursively initialized and optimized on a series of resolution adjusted images of one or more scale spaces, as discussed above. However, while the previous methods, such as method 300 and 400, initialized a larger number of active contours than there were boundaries, in the method 600, the second imaging technique provides a number of boundaries that are within the ROI. As such, the initialization of active contours in method 600 includes initializing a respective number of active contours as there are boundaries identified by the second imaging technique. Additionally, the active contours initialized in process block 605 will be initialized in a location determined by the second imaging technique data.

Process block 605 may be followed by process block 607, which includes optimizing the plurality of active contours within the ROI to locate feature boundaries within the ROI. The Optimization of the active contours may be performed as discussed previously with regards to methods 300 and/or 400, but may also be performed based on the second imaging technique data. Regardless of optimization process, process block 605 results in identification and location information regarding the boundaries within the ROI, the boundaries being interfaces between different materials within the ROI, such as the VNAND of FIG. 5.

Process block 607 is followed by process block 609, which includes performing metrology on the features within the ROI based on the optimized plurality of active contours. The metrology provides measurements of various aspects of the features within the ROI, such as feature dimensions, overall shape of the features within the ROI, information regarding process control and/or defects, and other desirable measurement-based information.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors or graphics processing units (GPUs) programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques. In some embodiments, the special-purpose computing device may be a part of the charged particle microscope or coupled to the microscope and other user computing devices.

Figure 7:
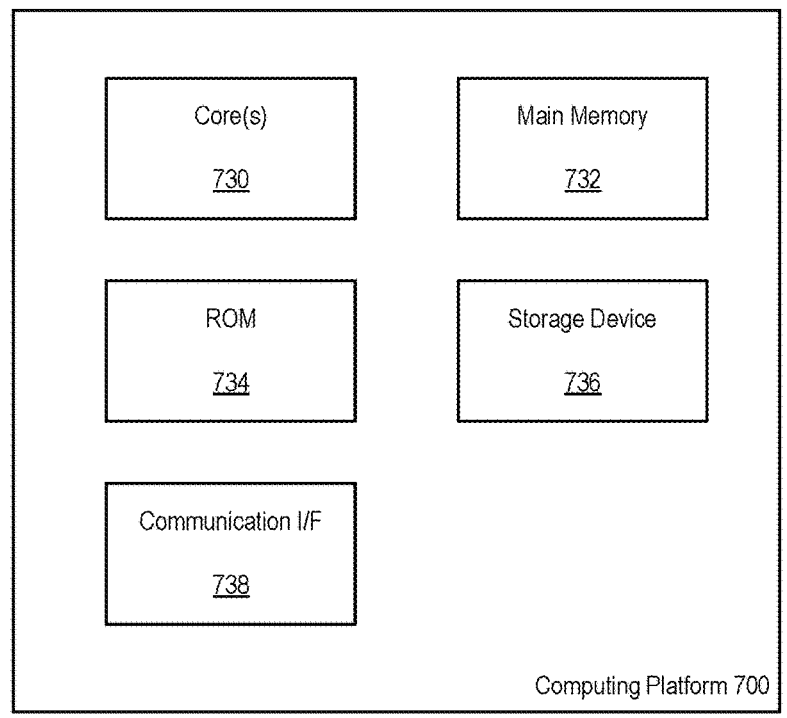
FIG. 7 is a block diagram that illustrates a computer system upon which an embodiment of the invention may be implemented.

For example, FIG. 7 is a block diagram that illustrates a computer system 700 upon which an embodiment of the invention may be implemented. The computing system 700 may be an example of the computing hardware included with the charged particle environment shown in FIG. 8. Computer system 700 at least includes a bus or other communication mechanism for communicating information, and a hardware processor 730 coupled with the bus (not shown) for processing information. Hardware processor 730 may be, for example, a general purpose microprocessor. The computing system 700 may be used to implement the methods and techniques disclosed herein, such as methods 300, 400 and/or 600, and may also be used to obtain images and process said images with one or more filters/algorithms.

Computer system 700 also includes a main memory 732, such as a random access memory (RAM) or other dynamic storage device, coupled to the bus for storing information and instructions to be executed by processor 730. Main memory 732 also may be used for storing temporary variables or other intermediate information during execution of instructions to be executed by processor 730. Such instructions, when stored in non-transitory storage media accessible to processor 730, render computer system 700 into a special-purpose machine that is customized to perform the operations specified in the instructions.

Computer system 700 further includes a read only memory (ROM) 734 or other static storage device coupled to bus 740 for storing static information and instructions for processor 730. A storage device 736, such as a magnetic disk or optical disk, is provided and coupled to bus 740 for storing information and instructions.

Computer system 700 may be coupled via the bus to a display, such as a cathode ray tube (CRT), for displaying information to a computer user. An input device, including alphanumeric and other keys, is coupled to the bus for communicating information and command selections to processor 730. Another type of user input device is a cursor control, such as a mouse, a trackball, or cursor direction keys for communicating direction information and command selections to processor 730 and for controlling cursor movement on the display. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 730 executing one or more sequences of one or more instructions contained in main memory 732. Such instructions may be read into main memory 732 from another storage medium, such as storage device 736. Execution of the sequences of instructions contained in main memory 732 causes processor 730 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 736. Volatile media includes dynamic memory, such as main memory 732. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise the bus. Transmission media can also take the form of acoustic or light waves, such as those generated during radio-wave and infra-red data communications.

Computer system 700 also includes a communication interface 738 coupled to the bus. Communication interface 738 provides a two-way data communication coupling to a network link (not shown) that is connected to a local network, for example. As another example, communication interface 738 may be a local area network (LAN) card to provide a data communication connection to a compatible LAN. Wireless links may also be implemented. In any such implementation, communication interface 738 sends and receives electrical, electromagnetic or optical signals that carry digital data streams representing various types of information.

Computer system 700 can send messages and receive data, including program code, through the network(s), a network link and communication interface 738. In the Internet example, a server might transmit a requested code for an application program through Internet, ISP, local network and communication interface 738.

Figure 8:
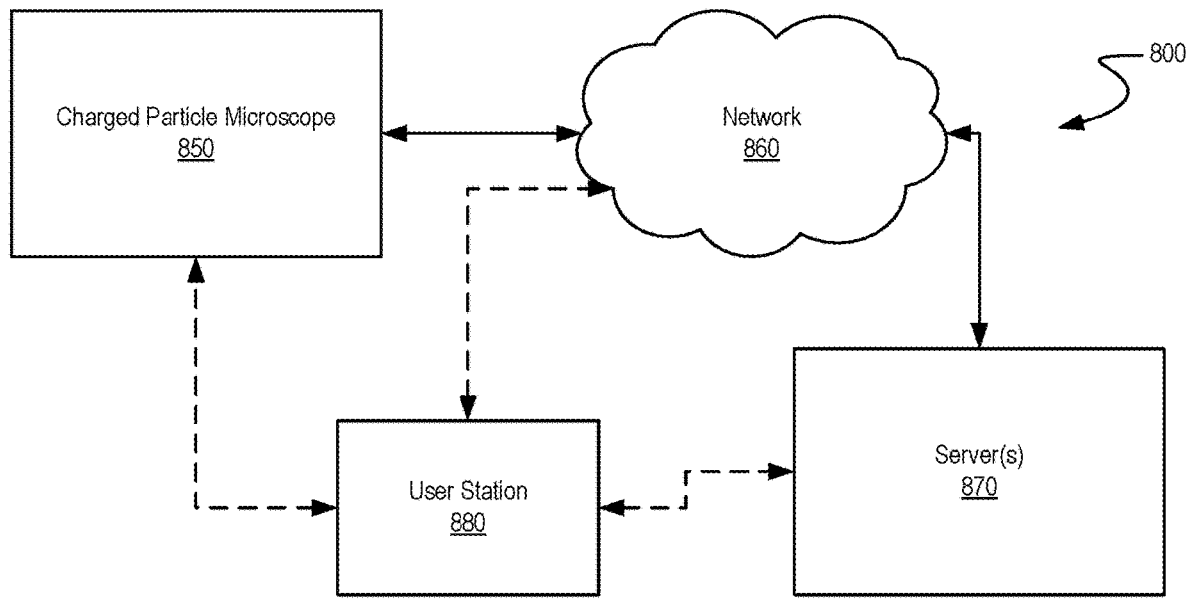
FIG. 8 is an example charged particle microscope environment for performing at least part of the methods disclosed herein and in accordance with an embodiment of the present disclosure.

The received code may be executed by processor 730 as it is received, and/or stored in storage device 736, or other non-volatile storage for later FIG. 8 is an example charged particle microscope environment 800 for performing at least part of the methods disclosed herein and in accordance with an embodiment of the present disclosure. The charged particle microscope (CPM) environment 800 may include a charged particle microscope 850, a network 860, a user station 880, and server(s) 870. The various components of the CPM environment 800 may be co-located at a user's location or distributed. Additionally, some or all of the components will include a computing system, such as the computing system 700, for performing the methods disclosed herein. Of course, the CPM environment is just an example operating environment for implementing the disclosed techniques and should not be considered limiting on the implementation of said techniques.

The CPM 850 may be any type of charged particle microscope, such as a TEM, an SEM, an STEM, a dual beam system, or a focused ion beam (FIB) system. The dual beam system is a combination of an SEM and a FIB, which allows for both imaging and material removal/deposition. Of course, the type of microscope is a non-limiting aspect of the present disclosure and the techniques disclosed herein may also be implemented on images obtained by other forms of microscopy and imaging. The CPM 850 may be used to obtain images of samples and ROIs included therein for processing with the methods disclosed herein. However, the disclosed methods may be implemented by the CPM environment 800 on images obtained by other microscopes as well.

The network 860 may be any type of network, such as a local area network (LAN), wide area network (WAN), the internet, or the like. The network 860 may be coupled between the other components of the CPM environment 800 so that data and processing code may be transmitted to the various components for implementing the disclosed techniques. For example, a user at user station 880 may receive an image from CPM 850 with intentions of processing in accordance with the disclosed techniques. The user may then retrieve code from server(s) 870, either directly or via network 860, for performing the image processing and metrology. Else, the user may initiate the process by providing the image to the server(s) 870, either directly or from the CPM 850 via the network 860, so the processing and metrology is performed by the server(s) 870.

In some examples, values, procedures, or apparatuses are referred to as "lowest", "best", "minimum," or the like. It will be appreciated that such descriptions are intended to indicate that a selection among many used functional alternatives can be made, and such selections need not be better, smaller, or otherwise preferable to other selections. In addition, the values selected may be obtained by numerical or other approximate means and may only be an approximation to the theoretically correct/value.

What is claimed is:

1. A method comprising:
   extracting a region of interest from an image, the region including one or more boundaries between different sections of the region of interest;

generating a multi-scale data set of the region of interest based on the region of interest;

initializing a model of the region of interest, the initialized model determining at least a first boundary and a second boundary within the region of interest;

optimizing a plurality of active contours within the region of interest based on the model of the region of interest and further based on the multi-scale data set, the optimized plurality of active contours identifying the one or more boundaries within the region of interest; and performing metrology on the region of interest based on the identified boundaries, wherein performing metrology on the region of interest comprises automatically performing geometric analysis of the different sections separated by the one or more boundaries.

2. The method of claim 1, further comprising enhancing at least the extracted region of interest based on one or more filters, and wherein the multi-scale data is generated at least in part on the region of interest.

3. The method of claim 2, wherein generating a multi-scale data set of the region of interest based on the region of interest comprises generating a plurality of image resolution levels of the region of interest using one or more scale spaces, wherein the one or more scale spaces selected from a Gaussian scale space, a geometric scale space, a non-linear scale space, and an adaptive space scale space.

4. The method of claim 2, wherein enhancing at least the extracted region of interest based on one or more filters includes:

improving a contrast of at least the region of interest within the image; and improving a signal to noise ratio of at least the region of interest within the image.

5. The method of claim 4, wherein improving the contrast and the signal to noise ratio comprises automatically selecting and applying the one or more filters, wherein the one or more filters are selected from histogram manipulation, linear and non-linear contrast enhancement, data normalization based on local, low-frequency data distribution, gamma correction, log-correction, and brightness correction.

6. The method of claim 1, wherein initializing a model of the region of interest, the initialized model determining at least first and second bounds of the region of interest comprises initializing the model of the region of interest based one or more image maps selected from binary labelled maps, interactive maps, distance maps, CAD maps, statistical models from the data, Dye cast, random distribution of geometric shapes, and geometric models.

7. The method of claim 1, further comprising:

improving sharpness of the region of interest;

differentiating and detecting the one or more boundaries in the region of interest; and wherein the model of the region of interest is initialized based in part on the differentiated and detected one or more initializing a model of the region of interest.

8. A method comprising, extracting a region of interest from an image, the region including one or more boundaries between different sections of the region of interest;

generating a multi-scale data set of the region of interest based on the region of interest;

initializing a model of the region of interest, the initialized model determining at least a first boundary and a second boundary within the region of interest;

optimizing a plurality of active contours within the region of interest based on the model of the region of interest and further based on the multi-scale data set, the optimized plurality of active contours identifying the one or more boundaries within the region of interest, wherein optimizing a plurality of active contours within the region of interest based on the model of the region of interest and further based on the multi-scale data set comprises:

initializing a first plurality of active contours within the first and second bounds of the initialized model; and allowing the first plurality of active contours to optimize to the plurality of active contours to identify the one or more boundaries within the region of interest; and performing metrology on the region of interest based on the identified boundaries.

9. The method of claim 8, wherein there are a greater number of active contours in the first plurality of active contours than there are boundaries within the region of interest.

10. A non-transitory, computer readable medium storing instructions that, when executed by one or more processors, triggers the one or more processors to perform the stems of:

extracting a region of interest from an image, the region including one or more boundaries between different sections of the region of interest;

generating a multi-scale data set of the region of interest based on the region of interest;

initializing a model of the region of interest, the initialized model determining at least first and second bounds of the region of interest;

optimizing a plurality of active contours within the region of interest based on the model of the region of interest and further based on the multi-scale data set, the optimized plurality of active contours identifying the one or more boundaries within the region of interest; and performing metrology on the region of interest based on the identified boundaries, wherein performing metrology on the region of interest comprises automatically performing geometric analysis of the different sections separated by the one or more boundaries.

11. The non-transitory, computer readable medium of claim 10, wherein optimizing a plurality of active contours within the region of interest based on the model of the region of interest and further based on the multi-scale data set comprises:

initializing a first plurality of active contours within the first and second bounds of the initialized model; and allowing the first plurality of active contours to optimize to the plurality of active contours to identify the one or more boundaries within the region of interest.

12. The non-transitory, computer readable medium of claim 11, wherein there are a greater number of active contours in the first plurality of active contours than there are boundaries within the region of interest.

13. The non-transitory, computer readable medium of claim 10, wherein the instructions further trigger the processor to cause the performance of enhancing at least the extracted region of interest based on one or more filters, and wherein the multi-scale data is generated at least in part on the enhanced region of interest.

14. The non-transitory, computer readable medium of claim 13, wherein generating a multi-scale data set of the region of interest based on the enhanced region of interest comprises generating a plurality of image resolution levels of the enhanced region of interest using one or more scale spaces, wherein the one or more scale spaces selected from a Gaussian scale space, a geometric scale space, a non-linear scale space, and an adaptive space scale space.

15. The non-transitory, computer readable medium of claim 10, wherein enhancing at least the extracted region of interest based on one or more filters includes:
- improving a contrast of at least the region of interest within the image; and
- improving a signal to noise ratio of at least the region of interest within the image.

16. The non-transitory, computer readable medium of claim 15, wherein improving the contrast and the signal to noise ratio comprises automatically selecting and applying the one or more filters, wherein the one or more filters are selected from histogram manipulation, linear and non-linear contrast enhancement, data normalization based on local, low-frequency data distribution, gamma correction, log-correction, and brightness correction.

17. The non-transitory, computer readable medium of claim 10, wherein initializing a model of the region of interest, the initialized model determining at least first and second bounds of the region of interest comprises initializing the model of the region of interest based one or more image maps selected from binary labelled maps, interactive maps, distance maps, CAD maps, statistical models from the data, Dye cast, random distribution of geometric shapes, and geometric models.

18. The non-transitory, computer readable medium of claim 10, wherein the instructions further trigger the processor to cause the performance of:
- improving sharpness of the region of interest;
- differentiating and detecting the one or more boundaries in the region of interest; and
- wherein the model of the region of interest is initialized based in part on the differentiated and detected one or more initializing a model of the region of interest.

* * * * *